(12) United States Patent
Aldridge et al.

(10) Patent No.: US 11,992,949 B2
(45) Date of Patent: May 28, 2024

(54) REMOTE ROBOTIC WELDING WITH A HANDHELD CONTROLLER

(71) Applicant: Sisu Devices LLC, Round Rock, TX (US)

(72) Inventors: Russell Aldridge, Austin, TX (US); Jacob Robinson, Round Rock, TX (US); Marc Christenson, Round Rock, TX (US)

(73) Assignee: Sisu Devices LLC, Round Rock, TX (US)

( * ) Notice: Subject to any disclaimer, the term of this patent is extended or adjusted under 35 U.S.C. 154(b) by 337 days.

(21) Appl. No.: 16/879,681

(22) Filed: May 20, 2020

(65) Prior Publication Data
US 2020/0368904 A1    Nov. 26, 2020

Related U.S. Application Data

(60) Provisional application No. 62/850,359, filed on May 20, 2019.

(51) Int. Cl.
| | | |
|---|---|---|
| *B25J 9/16* | (2006.01) | |
| *B25J 11/00* | (2006.01) | |
| *B25J 13/06* | (2006.01) | |
| *B25J 15/00* | (2006.01) | |

(52) U.S. Cl.
CPC ............. *B25J 9/1664* (2013.01); *B25J 9/161* (2013.01); *B25J 9/1651* (2013.01); *B25J 9/1679* (2013.01); *B25J 11/005* (2013.01); *B25J 13/06* (2013.01); *B25J 15/0019* (2013.01)

(58) Field of Classification Search
CPC ........ B25J 9/1664; B25J 13/06; B25J 11/005; B25J 9/1656; B25J 13/089; B25J 15/0019; B25J 9/1651; B25J 9/1679; B25J 15/0066; B25J 9/1666; B25J 9/1676; B25J 13/02; B25J 9/161; G05B 19/427; G05B 2219/39132; G05B 2219/39439; G05B 2219/35438; G05B 2219/45104; G05B 2219/36453; G05B 2219/36451; G05B 19/425; G05B 19/423; B23K 9/0953; B23K 9/1087
See application file for complete search history.

(56) References Cited

U.S. PATENT DOCUMENTS

| | | | | |
|---|---|---|---|---|
| 5,053,976 A | * | 10/1991 | Nose | ...................... B25J 9/1607 901/3 |
| 6,167,328 A | * | 12/2000 | Takaoka | ................. B25J 9/1671 700/250 |
| 2005/0149231 A1 | * | 7/2005 | Pretlove | ................. B25J 9/1671 700/264 |
| 2016/0023355 A1 | * | 1/2016 | Komatsu | ................ B25J 9/1682 901/8 |

(Continued)

*Primary Examiner* — Khoi H Tran
*Assistant Examiner* — Tanner L Cullen
(74) *Attorney, Agent, or Firm* — Eversheds Sutherland (US) LLP

(57) ABSTRACT

This disclosure describes systems, methods, and devices related to robotic point capture and motion control. A robotic device may synchronize one or more first axes of the robotic device with one or more second axes of a handheld device. The device may determine a welding path using the handheld device. The device may perform a weld by the traversing of an end effector of the robotic across the welding path, wherein the end effector comprises a welding tip.

15 Claims, 10 Drawing Sheets

(56) References Cited

U.S. PATENT DOCUMENTS

| | | | |
|---|---|---|---|
| 2016/0031089 A1* | 2/2016 | One | B25J 9/06 700/264 |
| 2016/0144513 A1* | 5/2016 | Fukunaga | G05B 19/409 901/5 |
| 2017/0274527 A1* | 9/2017 | Hida | G05B 19/409 |
| 2018/0095640 A1* | 4/2018 | Albright | G06F 3/04847 |
| 2018/0101166 A1* | 4/2018 | Aldridge | B25J 9/1671 |
| 2018/0157248 A1* | 6/2018 | Lee | B25J 9/1666 |
| 2018/0281173 A1* | 10/2018 | Hane | B25J 9/1664 |
| 2020/0039082 A1* | 2/2020 | Kapoor | B25J 13/06 |
| 2020/0101607 A1* | 4/2020 | Matsushima | B25J 9/1664 |

\* cited by examiner

| BASE NAME | Demo | | |
|---|---|---|---|
| TRANSLATION | ROTATION MATRIX | | |
| X -18.0017 | -0.0185134 | 0.052135 | 0.998468 |
| Y 436.34 | -0.060715 | 0.996738 | -0.0531704 |
| Z 815.356 | -0.997983 | -0.0616064 | -0.0152877 |
| Grab Point | OK | | CANCEL |

REMOTE ROBOTIC WELDING WITH A HANDHELD CONTROLLER

CROSS-REFERENCE TO RELATED APPLICATION

This application claims the benefit of U.S. Provisional Application No. 62/850,359, filed May 20, 2019, the disclosure of which is incorporated herein by reference as if set forth in full.

TECHNICAL FIELD

This disclosure generally relates to systems, methods, and devices for robotic motion technologies and, more particularly, for remote robotic welding with a handheld controller.

BACKGROUND

In general, robotic devices consist of multiple axes of motion, allowing robotic control of position and orientation in space. Multi-axis robotic devices are capable of moving within a given number of dimensions in space. Programming a robot to perform certain functions such as welding is a time consuming and cumbersome task due to the many issues that could arise in such an application.

DETAILED DESCRIPTION

Figure 1:
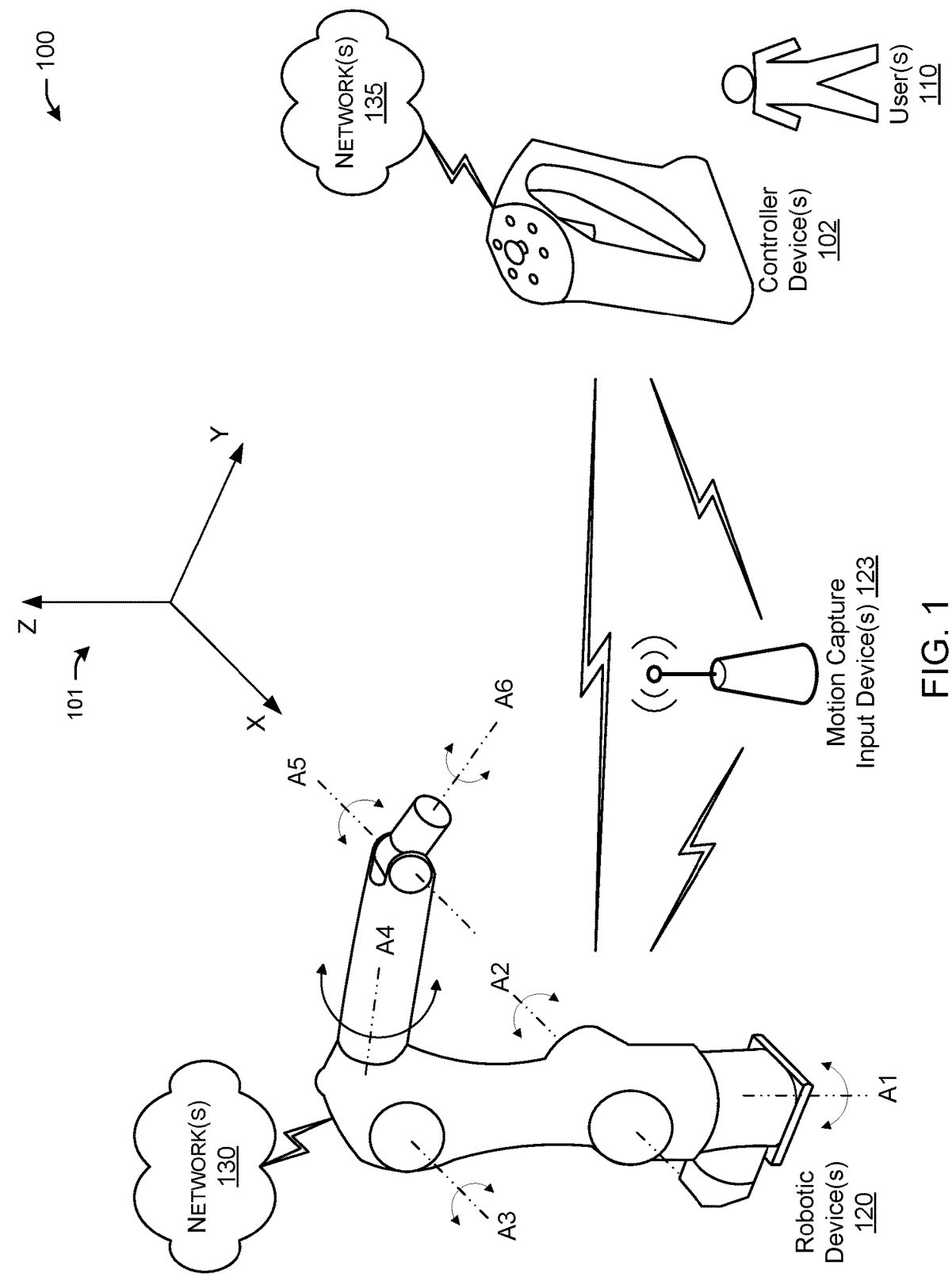
FIG. 1 depicts a diagram illustrating an example network environment of an illustrative robotic welding system, in accordance with one or more example embodiments of the present disclosure.

The following description and the drawings sufficiently illustrate specific embodiments to enable those skilled in the art to practice them. Other embodiments may incorporate structural, logical, electrical, process, and other changes. Portions and features of some embodiments may be included in or substituted for, those of other embodiments. Embodiments set forth in the claims encompass all available equivalents of those claims.

Robotic devices consisting of multiple axes of motion may allow robotic control of position and orientation in space. Programming the positions of these axes may be done manually, assigning angular or linear values to each axis and building a sequence of points to accomplish a given task. Programming can also be accomplished by mapping the axes to a coordinate system, allowing the inverse kinematics of the motion system to control the axes. This is useful particularly for robotic arms and provides for a Cartesian coordinate system to be used in place of a difficult to navigate angular axis coordinate system.

Acquisition of these data points, whether in angular form or in Cartesian coordinate form, is accomplished through a button and touchscreen interface, or using a three-dimensional mouse. In the case of the button and touchscreen interface, individual axes or directions in the Cartesian space are navigated by jogging the robot in different directions by holding a button. A more responsive interface is achieved in the case of the three-dimensional mouse, which captures the relative positional and angular shift of a floating button, allowing the user to jog the robot in a given direction or orientation in a Cartesian coordinate system.

While robust, these interfaces are typically slow and difficult to use. Navigating to different points often requires switching between different modes and ranges of operation, resulting in slow point acquisition. The movements generated by these control systems are also not intuitive, increasing the risk of user error and machine damage.

Robotic devices offer high precision and rapid speeds, but must be controlled in such a way that takes advantage of these qualities while compensating for the large inertia. For example, heavy-duty industrial robotic arms may have inherently large inertia. Some controllers offer a simple way to generate endpoint motions, but suffer from slow settling times and inefficient motions consisting of high initial forces and low final forces.

Robotic applications require the operator to "teach", "program", or "capture" 3-dimensional points that serve as target points for robot motion. Typically, the robot must be moved to the specified location and orientation to capture the desired point. This often means the operator must move the robot into a gross position and then make very slow, fine moves, to bring the robot into the exact orientation desired.

Example embodiments of the present disclosure relate to systems, methods, and devices for robotic welding.

In one embodiment, a robotic welding system may enable the capturing of one or more points in space associated with a handheld controller device without having to move the robot to one or more points in space during programming.

In one embodiment, the robotic welding system may include a wireless controller device or a wired controller device (e.g., a handheld device) communicating the position and the orientation data to a motion capture input device. The motion capture input device maps the local orientation and position data into a coordinate system aligned with the robot or motion control system of the robot. The motion control system of the robot may comprise multiple axes of motion, controlled through a Cartesian coordinate system through an inverse kinematics mapping in one embodiment, or with each axis of motion controlled directly with no transformation mapping in another embodiment. Motion data from the controller device is transmitted to the motion system associated with the robot through a robot communication interface. This interface can be any wired or wireless communication protocol used to send and receive motion information from the robot. In one embodiment, the robot communication protocol may be a UDP message sent from the robot to the motion capture input device, with an expected reply containing the next required position to move to.

In one embodiment, a robotic welding system may facilitate controlling the robot motion based on a hand gesture while holding the controller device. For example, a user may hold the controller device and may move his or her hand such that the robot moves in the same direction as the hand gesture. That is, the robot may follow the controller device's movement direction regardless of the controller device's orientation and with a speed that is proportional to the amount of force applied to the trigger. This allows the user to program the robot very quickly and intuitively. For example, as the handheld controller device traverses a path in space, it sends at a predetermined time interval information including the handheld controller device coordinates to the motion capture input device.

Programming a robot is usually accomplished using a "teach pendant" connected to the robot to slowly move the robot in one direction or one axis at a time. This means that users must stay in the same position or readjust in their minds how the robot will move when they press certain buttons. The pendant usually contains fixed buttons, soft buttons with a fixed personality, and/or a 3D "space-ball" that allows for control of the robot in a fixed frame of reference. This controller may allow for translation of the end effector in multiple directions at once (XYZ), but does not allow for articulation of the end effector at the same time unless individual axes are controlled one at a time. The motion is not intuitive and is very time consuming. The user must often stop and switch between different modes of robot control.

Although there are methods available for capturing 3D points in space, these methods have not been applied to the field of industrial robotics to align the robot, create safe spaces, or guide the robot in 3D space without moving the robot. Some examples of points in space include points that define 3D planes to define safety boundaries such that the robot does not move past a specified boundary to prevent operator injury or equipment damage), or points on a tool or workpiece with which the robot must interact. The boundary applies not only to the end effector of the robot but also to other parts of the robot. These parts of the robot should not breach the safety barriers. Some simulation tools exist which allow the robot to be moved in 3D space from a CAD/CAM program, but a tool for marking points in space using a physical controller does not exist.

In one embodiment, a robotic welding system may facilitate a single point and orientation capture in 3D space using a handheld controller and touch probe. The touch probe may allow capturing of one or more points and orientations in the 3D space as the handheld device traverse the 3D space. The touch probe and handheld controller could be the same device, or separate devices that may be connected together. In one embodiment, the touch probe may be attached to the handheld controller to act similarly to the robot end effectors. That is, the touch probe may act as an end effector of a robot, which may move based on the movements of the handheld device. This is useful for teaching the robot without moving the robot. For example, if the end effector of the robot has an attachment that includes a gripper, the touch probe on the controller device may also act as a gripper attached to the handheld device. This arrangement may be used by a user to capture one or more points and orientations in the 3D space. These captured points and orientations may then be used to program the robot. The robot may then perform the actions that were programmed using the handheld controller and the touch probe.

In one embodiment, a robotic welding system may facilitate the creation of one or more planes, points, or axes based at least in part on capturing of points and orientations in 3D space using the handheld controller and the touch probe.

In one embodiment, a robotic welding system may instantaneously align a robot to planes or axes defined by the controller point capture.

In one embodiment, a robotic welding system may facilitate the ability to prevent a robot from moving past "keepout" planes or regions, which are defined using planes, captured above. Keepouts could apply to the end effector, other parts of the robot, or both. Adding "keepout areas" by defining those areas in the real world via a position recording device allows for the robot programmer to not hit any objects while programming. This feature is not available in any other robot programming methods.

In one embodiment, a robotic welding system may use one or more methods of position and orientation capture. For example, the robotic welding system may "fuse" together one or more technologies to overcome weaknesses faced by other technologies. For example, optical techniques may provide higher accuracy than magnetic ones, but optical techniques are limited to line of sight operations. The robotic welding system may use magnetic, optical, inertial measurement units (IMUs), and other techniques for capturing position and orientation in a robotic application concurrently and/or simultaneously. In some examples, tracking dots, or a "puck" with LED's may be placed on the handheld controller and on the end effector of the robot. The cameras track both objects and are able to understand and determine the location and orientation of the objects in space. This allows the robotic welding system to get sub-millimeter precision.

In one embodiment, a robotic welding system may facilitate a robot teaching using a robot orientation and path planning by selecting individual points in free space using the controller. In a play mode, the robot may traverse from point to point based on the captured orientation and path. The robot can come to rest at one point or follow points as portions of a spline. The advantage is that the operator may teach entire paths or portions of paths without moving the robot. An example may be selecting individual points along a welding path.

In one embodiment, a robotic welding system may facilitate robot teaching using a robot orientation and path planning by "recording" a path in free space using the handheld controller. In a play mode, the robot may follow this path as a complete spline. An example may be teaching the robot how to spray paint a car or weld an object by moving the handheld controller in 3D space and having the touch probe acting as a spray nozzle or a welding tip.

In one embodiment, a robotic welding system may facilitate the ability to "call" the robot to a specific position based on a single position and orientation reading from the handheld controller. The user may select the position in free space, moves out of the way, and then initiates the robot's motion to the selected position by modulating the speed with the trigger on the controller. That is the user may make the robot move from slow to fast based on gently pressing the trigger to firmly pressing the trigger. For example, the user may move the handheld controller during the learning stage and may press at least one button on the handheld controller to program the position in free space.

In one or more embodiments, a robotic welding system may perform one weld at a time using a handheld controller. Instead of writing a program to weld out an entire part, this simply is a feature that allows the operator to move the torch to an initial start position by moving the handheld in space to be positioned at the initial start position, the operator may then click a button to indicate the start point, and then move the handheld controller and a path that may be mimicked by the robot where the operator may then click one or more additional points through that path, which the robot will move the welding torch to create an uninterrupted weld path. When the operator selects "run" and squeezes the trigger of the handheld controller, the robot automatically moves back to the start point, turns on the arc, follows the pre-recorded path using the pre-set parameters (weave settings, wire speed, weld speed, weld angle, etc.), and then automatically turns the arc off. Essentially, the welder is having the robot perform a weld, one weld at a time. The rates of motion between the handheld controller and the robot could be scaled at different proportions so that the user could get more precises robot motions out of large user control motions or magnify the robot motion using small controller motions. This scaling could happen for example by the amount of force applied to the trigger or by other means.

In one or more embodiments, a robotic welding system may facilitate that the weld path could be saved and eventually be part of a larger program, but a function of this feature is to have a robot do a single weld path at a time with perfect weave and speed control then add additional weld paths that are saved separately. The operator may save a single weld path as described above by starting from an initial start position and clicking a button on the handheld controller as the operator moves from the initial start position to the next point in the path. When the operator clicks the button on the handheld controller, the system saves that points in space so that the robot may traverse the path from the initial start position to the next point in the path. The robot uses preset functions like current, voltage, wire speed, weave pattern, dwell, etc. while performing the weld. This is useful for operators who do not have precise weave control, for reducing operator fatigue, or where the orientation or location of the weld is difficult for a human to navigate. It is helpful when operators are welding one part at a time, or where the parts have a significant amount of variability. It provides a much more uniform weld than if the operator is welding all parts completely by hand in one motion.

In one or more embodiments, a robotic welding system may facilitate remote manual welding using a handheld controller. The operator many move the torch, attached to the robot arm, to the desired start location and may press a button on the handheld controller to "arm" the system. Once the system is armed, the arc starts once the operator pulls the trigger on the handheld controller. Pulling the trigger gives the user control of the orientation and translational position of the torch and maintains the arc in the "on" position. The operator uses the handheld controller to move the torch across the weld path, using a manually controlled weave or any other path, to complete the weld. The robot follows the exact path of the operator's hand. When the operator releases the trigger, the arc is turned off and the robot stops moving. If the operator pulls the trigger again without "arming" the system, the robot will move, but the arc will not start. This is useful for welding in hazardous environments, where welding is done using a camera, or anywhere that is inconvenient or unfeasible to have the operator in close proximity to the arc.

In one or more embodiments, a robotic welding system may facilitate remote manual welding with automatic weave control. This is similar to the remote manual welding described above, except the operator simply guides the robot across the desired path. The weld speed is controlled by the variable press of the trigger on the handheld controller. That is, based on the amount of pressure applied to the trigger, the weld speed is adjusted accordingly. The weave portion (side to side, circular motion, trapezoidal, etc.) of the robot path is performed automatically. The operator can control the distance from the torch to the workpiece by visual observation and manual control using the controller, or by using a laser distance, or other non-contact distance sensor which keeps the torch at a constant distance or specific angle to the workpiece.

In one or more embodiments, a robotic welding system may facilitate switching control between torch robot and workpiece manipulator. The robotic welding system may be switched on the fly between guiding the motion of the welding robot holding the torch and controlling the manipulator holding the workpiece (if a manipulator is used). The manipulator is typically a one or more axis device that can slide, rotate, or reposition the workpiece for improved access during welding. For example, a table can rotate and is an example of a welding manipulator. A manipulator could be a completely separate 6 axis robot.

In one embodiment, a robotic welding system may visually illustrate the points of a robot program on a user interface by showing a 3D image of the robot moving to each point as the user scrolls through points. The point path may also be shown as a spline.

The above descriptions are for purposes of illustration and are not meant to be limiting. Numerous other examples, configurations, processes, etc., may exist, some of which are described in detail below. Example embodiments will now be described with reference to the accompanying figures.

FIG. 1 is a diagram illustrating an example network environment of an illustrative robotic welding system, in accordance with one or more example embodiments of the present disclosure. The network environment 100 may include robotic device(s) 120 and one or more controller devices 102, which may communicate in accordance with, and be compliant with, various communication standards and protocols, such as optical mechanisms, magnetic mechanisms, Wi-Fi, user datagram protocol (UDP), time sensitive network (TSN), wireless USB, Wi-Fi peer-to-peer (P2P), Bluetooth, near field communication (NFC), or any other communication standard.

Figure 9:
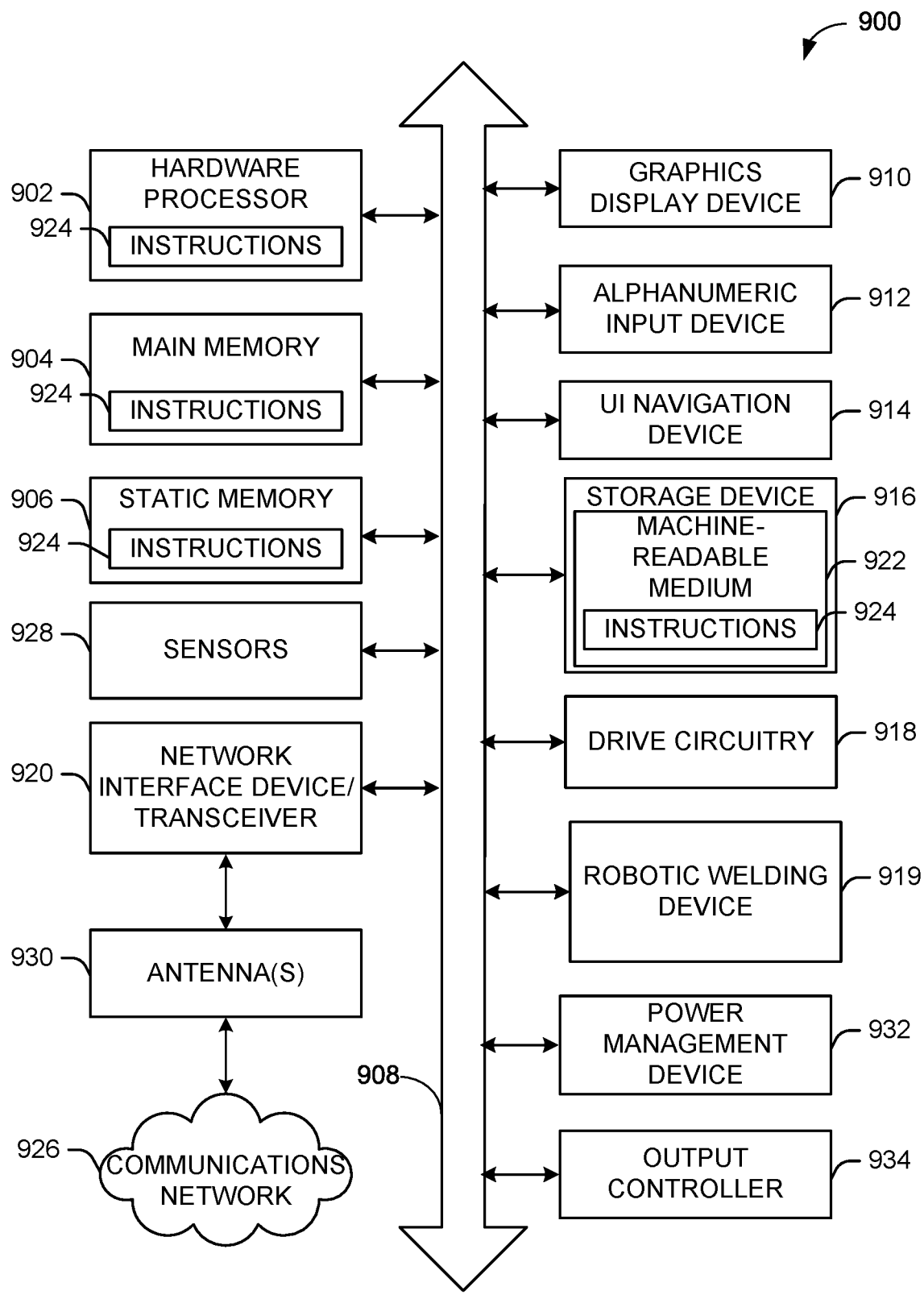
FIG. 9 depicts a block diagram of an example robotic machine upon which any of one or more techniques (e.g., methods) may be performed, in accordance with one or more example embodiments of the present disclosure.

In some embodiments, a robotic device 120, one or more motion capture input devices 123, and a controller device 102 may include one or more computer systems similar to that of the example machine/system of FIG. 9.

In one embodiment, and with reference to FIG. 1, a robotic device 120 may communicate directly with the controller device 102. For example, the two devices may communicate through a wired or a wireless connection (e.g., magnetic, optical, wireless technology based communication, cables, etc.). In other examples, the two devices may communicate through a motion capture input device 123, where the motion capture input device 123 may act as a base station. In some scenarios, the robotic device 120 and the controller device 102 may communicate through various networks (e.g., network 130 and/or network 135). In some scenarios, the motion capture input device 123 may be part of the robotic device 120.

The robotic device 120 may have various applications. For example, the robotic device 120 may be configured as an industrial robot, an aerospace application, an automation tool, welding, painting, or any other applications.

In one embodiment, a robotic welding system may use one or more methods of position and orientation capture. For example, the robotic welding system may "fuse" together one or more technologies to overcome weaknesses faced by other technologies. For example, optical techniques may provide higher accuracy than magnetic ones, but optical techniques are limited to line of sight operations. The robotic welding system may use magnetic, optical, inertial measurement units (IMUs), and other techniques for capturing position and orientation in a robotic application concurrently and/or simultaneously. For example, optical techniques may be used in situations where line of sight is not limited, while other techniques such as magnetic or wireless may be used when line of sight is limited. A determination may be made by the controller device and the base station (e.g., motion capture input device 123) based on thresholds. For example, a controller device may emit light through one or more LED emitters towards the base station. The base station may then perform analysis on the received light signals from the one or more LED emitters. The base station may contain an optical received signal strength indicator (RSSI) circuit that may be used to determine the strength of the received light signal(s).

In the scenario for using optical technology for the robotic welding system, the robotic welding system may comprise one or more cameras and one or more LED emitters that may be incorporated with the components of the robotic welding system. For example, the controller device may comprise one or more LED emitters that may be sent to a base station that comprises cameras. The base station cameras may capture the light signals emitted by the LED emitters and may translate the light signals into information and data that may be used by the base station to control a robot. For example, the controller device may encode the data associated with its position and orientation as it is being held by a user. The encoded data may be encapsulated and sent through one or more LED emitters as light signals to the base station. The base station cameras receiving these light signals will decode and extract the data that was sent as light signals from the controller device. This data may be captured and saved in a storage unit on the base station.

In some examples, tracking dots, or a "puck" with LED's may be placed on the handheld controller and on the end effector of the robot. The cameras track both objects and are able to understand the location and orientation of the objects in space. This allows the robotic welding system to get sub-millimeter precision.

The controller device 102 may be a handheld device that may comprise buttons, a joystick, a trigger that may be used as a form of motion input. The controller device 102 itself may act as a joystick as a user moves it in free space it effectuates the movement of the robot. The vector of joystick motion may be mapped to a plane intersecting the controller device 102, and corresponding global position vectors are applied to the robotic device 120.

The controller device 102 may control the robotic device 120 by transmitting control signals to the robotic device 120 through a wire or wireless signals and vice versa. For example, the controller device 102 may send the control signal as an Ethernet packet through an Ethernet connection (e.g., an EtherCAT bus) to the robotic device 120.

The motion capture input device 123 may be a standalone device or may be included in the robotic device 120. The controller device 102 may communicate its position and orientation data to the motion capture input device 123. This maps the local orientation and position data into a coordinate system aligned (e.g., synchronized) with the robot's motion control system. The motion control system of the robot may comprise multiple axes of motion, controlled through a Cartesian coordinate system through an inverse kinematics mapping in one embodiment, or with each axis of motion controlled directly with no transformation mapping in another embodiment. Motion data from the controller device is transmitted to motion system associated with the robot through a robot communication interface. This interface can be any wired or wireless communication protocol used to send and receive motion information from the robot. In one embodiment, the robot communication protocol may be a UDP message sent from the robot to the motion capture input device 123, with an expected reply containing the next required position to move to. The motion capture input device 123 emits an alternating magnetic field, which is sensed by the controller (102). The field can be either a direct field or alternating field. Multiple motion capture input devices 123 could be used to increase accuracy or reduce interference.

The controller device 102 and the robotic device 120 may communicate using a robot communication protocol such as a user datagram protocol (UDP). A UDP message may be sent from the robotic device 120 to the controller device 102 or vice versa. A reply to the UDP message may contain a next position or a new position that the robotic device 120 will move to.

The controller device 102 may also contain haptic feedback devices to provide vibration for certain events, like adding a point, or to communicate robot inertia to the hand of the operator. This may be applicable to a "spray paint" mode to help the operator understand on the fly the kinds of accelerations they are "asking" the robot to do while the robot is being taught. There could also be feedback that tells the user when they have gone outside the reach or possible orientation of the robot before they add a point the robot could not possibly get to. The controller device 102 could also have a light or a display that communicates information to the user. For example, the control device 102 may the couple to a user display that may provide a user interface to display information associated with the controller device and the robotic device. A user may interact with the user interface in order to modify, add, save, or delete any of the information.

The robotic device 120 may receive the control signal and may be controlled by the received control signal. The control signal may be received directly from the controller device 102, or may be received through the motion capture input device 123. For example, the control signal may cause the robotic device 120 to apply or remove pneumatic air from a robotic gripper of the robotic device 120, or any kind of input/output or generic gripper or any device to communicate to on the robot. Further, the control signal may cause the robotic device 120 to move to a new position in space. When the robotic device 120 receives the control signal, new state information is applied, and any needed motion to the new position may be executed. The robotic device 120 may also transmit a signal indicating its status to the controller device 102, which may happen directly between the controller device 102 and the robotic device 120 or through the motion capture input device 123. The robotic device 120 may be configured to rotate along rotation axes of motion. The robotic device 120 consisting of these rotation axes of motion may allow control of the position and orientation in space. For example, the robotic device 120 may have six degrees of freedom resulting in a full range of orientations and positions within a given space. Programming the positions of these rotation axes may be done manually, by assigning angular or linear values to each axis and building a sequence of points to accomplish a given task. Programming can also be accomplished by mapping the axes to a coordinate system (e.g., coordinate system 101), allowing the inverse kinematics of the motion system to control the axes. This is useful particularly for robotic arms and provides for a Cartesian coordinate system to be used in place of a difficult to navigate angular axis coordinate system.

It should be understood that the six degrees of freedom is used here, this is only for illustration purposes and that the robotic welding system could apply to robotic device with any number of degrees freedom. For example, seven axis collaborative robots, as well as SCARA robots or even XYZ gantries. Further, it may be conceivable that the robotic welding system may apply outside the realm of industrial robotics. For example, to manipulate a drone or a humanoid robot.

In the example of FIG. 1, the robotic device 120 may be configured to have six rotation axes, A1, A2, A3, A4, A5, and A6. Each of the rotation axes A1, A2, A3, A4, A5, and A6 is able to allow a section of the robotic device associated with that axis to rotate around that axis. When all of the angles of the rotation axes A1, A2, A3, A4, A5, and A6 are determined, the entire status of the robotic device 120 may be determined.

In one embodiment, the controller device 102 and the robotic device 120 may utilize a synchronized coordinate system (e.g., coordinate system 101) that facilitates mapping all of the rotation axes A1, A2, A3, A4, A5, and A6 to the coordinate system 101. Moving the controller device 102 along at least one of the axes of the coordinate system 101 may control the angles of the rotation axes A1, A2, A3, A4, A5, and A6 of the robotic device 120 according to the position, orientation, and movement of the controller device 102. That is, a user 110 may be able to manipulate the position, orientation, and movement of the controller device 102 and, as a result, manipulating the position, orientation, and movement of the robotic device 120. The position, orientation, and movement of the controller device 102 may be translated into instructions that may be used in one or more control signals to control the robotic device 120. Ultimately, these instructions may control the angles of the rotation axes A1, A2, A3, A4, A5, and A6, in order to perform a certain action or to move the robotic device 120 to a new position in space.

In other words, the robotic device can be "locked" so that it only moves in a single coordinate frame 101. It can also be locked so that it only moves in relation to the coordinate system defined by the end effector axis A6. It can also be set up so that it moves only along any arbitrary axis or moves in relation to an offset from a plane. It can also be defined so that the end effector rotates or articulates around some point in space.

Figure 2A:
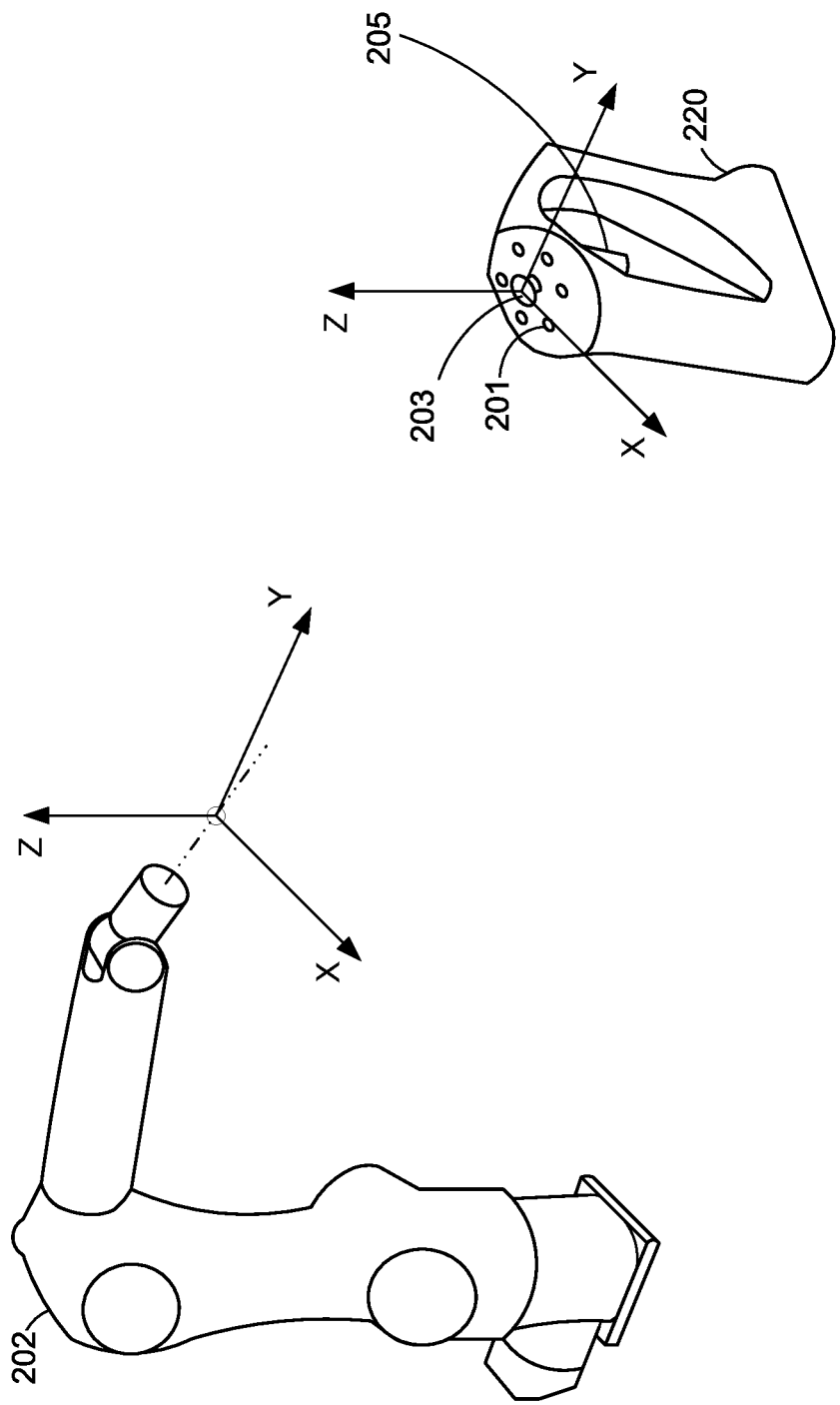
FIGS. 2A and 2B depict illustrative schematic diagrams of a robotic welding system, in accordance with one or more example embodiments of the present disclosure.
Figure 2B:
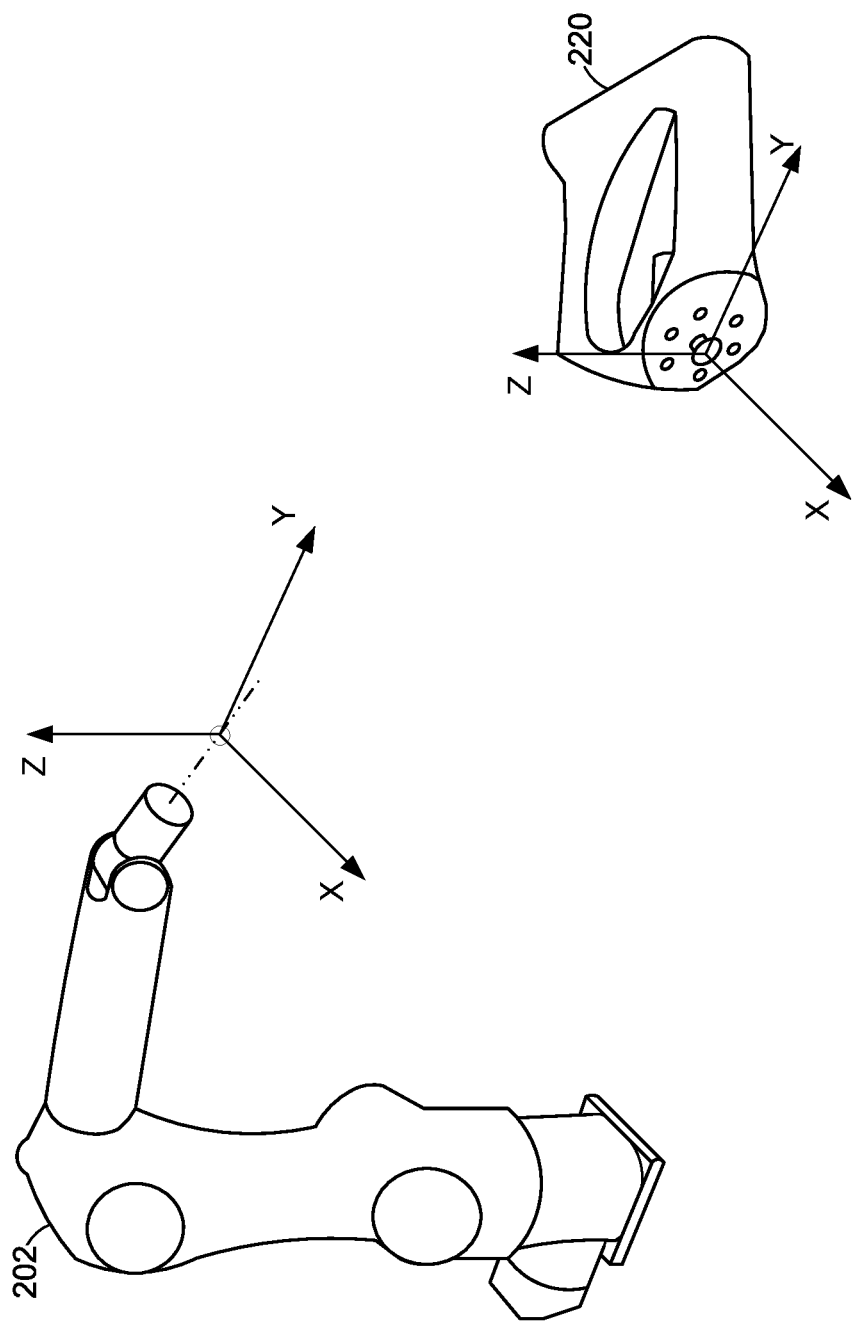

FIGS. 2A and 2B depict illustrative schematic diagrams of a robotic welding system, in accordance with one or more example embodiments of the present disclosure.

Referring to FIG. 2A, there is shown a robotic device 202 and a controller device 220 (e.g., a handheld device). The controller device 220 may include one or more buttons that may be pressed to affect one or more features of the controller device 220. For example, as shown in FIG. 2A, the controller device 220 comprises buttons 201, joystick 203, and trigger 205).

In one embodiment, a robotic welding system may manipulate the orientation and position of the robotic device 202 based on inputs from the controller device 220, which may be controlled by a user. In other words, the orientation of the controller device 220 and other inputs on the controller device 220 may result in the robotic device 202 moving its one or more end effectors to a desired location. For example, a user who may hold the controller device 220 may vary the orientation and position of the controller device 220, in order to generate a respective orientation and position of the robotic device 202. In that sense, the user is capable of moving the controller device 220 in space, to cause a movement of the robotic device 202 end effectors from one point in space to another. A user may program the robotic device 202 by moving the controller device 220 through a desired path.

In one embodiment, a robotic welding system may facilitate a training mode such that the controller device is capable of learning and capturing points in space at various locations being traversed using the controller device. The user may press the pressure sensitive trigger to gain control of the robot. The robot may be moved into the desired position and orientation of a point in space and then the trigger is released. A button is pressed on the controller device to add the point. Adding the point means that the point is recorded into the program for later execution in the execution mode. The robot may then be moved to subsequent positions and orientations where additional points are added. Buttons can be configured on the controller to manipulate various functions of the robot or end effector. An example of an end effector may be a gripper on the robot such that the gripper is capable of gripping objects to be manipulated by the robot. A new point can be added to a given position that opens or closes the gripper at that position. It should be understood that an end effector may also be an attachment that could be attached to a part of the robot in order to perform a specific function. In robotics, an end effector is the device at the end of a robotic arm, designed to interact with the environment. The exact nature of this device depends on the application of the robot. For example, the end effector could be a welding attachment, a paint dispenser or sprayer, or any other type of attachment.

In one embodiment, a robotic welding system may facilitate alteration of recorded points and/or addition of new points to be recorded. For example, a user is capable of scrolling to various recorded points and then pressing a button to modify or insert a point. The user is also capable of adjusting the robot to the desired position and add the point.

In one embodiment, the robotic welding system may activate the robot control when the user presses the pressure-sensitive trigger on the controller device. For example, a point may be defined at some predetermined distance from the end of the robot arm. When the user moves the controller device 220 upward, all axes of the robot move in a coordinated fashion so that the result is that the point moves upward in space. It should be understood that the distance traveled by the point may be proportional to the distance traveled by the controller device 220. That is, if the user moves the controller device 220 upward by a distance D, the point may also move upwards by a distance that may be proportional to the distance D. To activate the robot control, the user presses the pressure-sensitive trigger. Imagine a point defined some fixed distance from the end of the robot arm. When the user moves the controller upward, all axes of the robot move in a coordinated fashion so that the result is that the point moves upward in space. The same is true for movements of the controller device 220 down, left, right, forward, and back. It should be understood that this type of movement is referred to as translation. That is translating the movement of the controller device 220 into movements of the robot device 202.

In one embodiment, the robotic welding system may map the positions and orientations of the controller device 220 into robot coordinates, through direct Cartesian coordinate representation or abstracted axis motion mapping.

In one embodiment, the robotic welding system may generate an appropriate motion from the indicated input, and immediately direct the robotic device 202 to move towards a new final position. In another embodiment, the robotic welding system may capture positions of the robotic device 202 when the user positions the controller device 220 in order to arrive at a desired location. The robotic welding system may store these positions for future playback and adjustment.

In one embodiment, the controller device 220 may include navigation buttons that may be used to capture one or more points in space associated with a location of the robotic device 202. Further, the controller device 220 may include navigation buttons that may delete one or more recorded points in space. The controller device 220 may include additional button and trigger buttons for performing other programming actions. It should be appreciated that the navigation buttons may be programmed based on a user preference and profile.

In one embodiment, the robotic welding system may facilitate a plurality of robotic devices 202 to be controlled simultaneously using multiple controller devices 220. Consequently, motions may be performed in parallel and coordinated moves between two or more robotic devices 202 may be accomplished in real time using one or more controller devices 220.

In one embodiment, the robotic welding system may facilitate pressure sensitive button control of the navigation buttons of the controller device 220. The pressure sensitive button control may be used to determine a range of motion generated by shifting positions and orientations from the controller device 220. This may allow the user to indicate the degree to which position and orientation changes will affect the robotic or motion control position. For example, by squeezing the trigger button fully, the robotic welding system may generate a large motion. The robotic welding system may generate small motions by releasing pressure from the trigger button. Fully releasing the trigger may disengage the robotic motion entirely. In another embodiment, engaging and disengaging motion can be accomplished by a button, a slider, or another tactile input device.

In one embodiment, the robotic welding system may determine that completely releasing the trigger button may allow the controller device 220 to be moved to a new position in space before re-engaging control. This may allow a click and drag motion to be accomplished, enabling the user to move across large distances with very little effort. It should be understood that the controller device, the joystick on the controller device, and the trigger on the controller device control the robot in moving along axes, along planes, and rotationally in three dimensional space. In order to make the robot rotate, the user device may rotate the handheld controller device, or my use the joystick or the trigger to cause the robot to rotate in space. This means that the robot can be controlled not only in XYZ with the trigger, but also in roll, pitch, and yaw.

Referring to FIG. 2B, axis locking is shown such that a controller device 220 is able to rotate without affecting the orientation of the coordinate system of the robotic device 202. The orientation of the coordinate system of the robotic device 202 is shown in three dimensions having a first direction (X), a second direction (Y), and a third direction (Z) for illustration.

In one embodiment, the controller device 220 may be rotated by a user moving their hand in space to align the controller device 220 to be parallel to the ground or perpendicular to the ground or any other orientation without affecting how the joystick is moved on the control device 220. That is, although the control device 220 may be in one orientation in space, pushing the joystick in the first direction, causes the robotic device 202 to move in that same first direction. Similarly pressing the joystick to move in the second direction, causes the robotic device 202 to move in that same second direction.

In one embodiment, the controller device 220 may include a button that may be used to activate axis locking, in which the dominant direction of translation or rotation from the user is detected. When this axis of translation or rotation is detected, the robotic welding system may lock out or freeze motion in all other axes, allowing control in this particular axis of motion without disturbing other directions. For example, in the case where the controller device 220 does not translate, but remains in the same XYZ position in space. When the user rotates the controller device 220 about the controller centroid, the robot device 202 moves all axes in a coordinated fashion so that the imaginary point remains in its own fixed point in space, but the end of the robot arm remains "pointed" at that imaginary point, and rotates about it. This means the robot can pitch up and down, yaw left or right, or remain pointed in the same direction, but rotate about the axis in the direction it is pointed.

Axis locking may be activated on global Cartesian axes (e.g., axes X, Y, Z) of the robotic device 202. This may allow locking the translations in the global X, Y, or Z axes, and may also allow locking the rotations about the global X, Y, or Z axes. Axis locking may also be accomplished with respect to local coordinates relative to the end effector of the robotic device 202. Consequently, local movements of the end effector may be mapped and controlled.

Further, axis locking may include the ability to map to a particular axis of the robotic device 202, allowing individual axes to be jogged while ignoring inverse kinematics (IK) mapping or Cartesian axes. For example, the robotic welding system may determine the motion of the controller device 220 along the relative controller X axis, and the relative controller Z axis is translated into motion in the corresponding local axis X of the robotic device and the local axis Z of the robotic device. By engaging axis locking, motions in the dominant relative axis of the controller device 220 may be mapped directly to the corresponding local axis of the robotic device. It is understood that the above descriptions are for purposes of illustration and are not meant to be limiting.

Figure 3A:
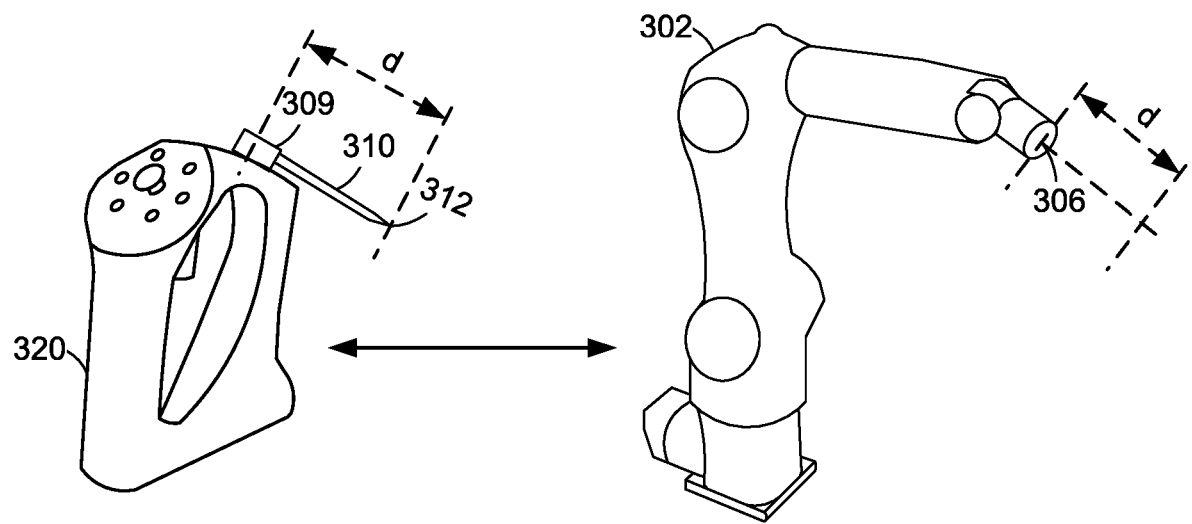
FIGS. 3A and 3B depict a robotic welding system, in accordance with one or more example embodiments of the present disclosure.
Figure 3B:
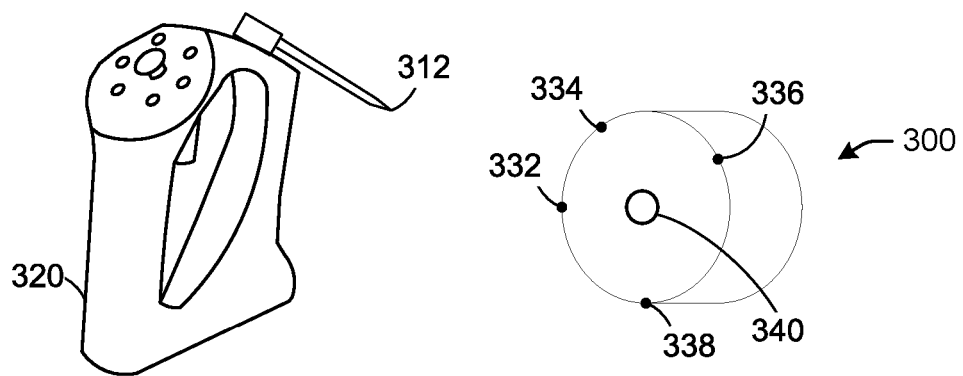

FIGS. 3A and 3B depict a robotic welding system, in accordance with one or more example embodiments of the present disclosure.

Referring to FIG. 3A, there is shown a control device 320 having one or more probes 310 attached to a connector 309 of the control device 320. A probe 310 may be a replica of an end effector of a robot, a point device, a tool, or any other suitable devices. In one example, the probe 310 may have a probe tip 312 that may be used to designate a point in space. That is, the probe tip 312 may be associated with a point and space that indicates coordinates. The coordinates of the probe tip 312 may indicate the location of the probe tip 312. The control device 320 may determine the coordinates of the probe tip 312 based on a profile associated with the probe 310 that may have been determined based on the type of the probe 310 used. The profile associated with probe 310 may include length of the probe 310 and positioning of the probe 310 when installed on the control device 320. The profile associated with the probe 310 may be inputted to the robotic welding system during installation of the probe 310. The profile of the probe 310 may be sent to a base station (e.g., motion capture input device 123 of FIG. 1) to determine specific actions that may be performed by the robotic welding system.

In one or more embodiments, the probe 310 may have an offset distance (e.g., distance d) from a location on the controller device 320. The controller device may be a position-sensing and orientation-sensing hand-held controller device. For example, the controller device 320 may contain circuitry comprising a sensor that can sense and capture the position and orientation of the control device relative to a coordinate system. The captured position and orientation may then be sent to the base station (e.g., motion capture input device 123 of FIG. 1) to keep track of where the control device is positioned and how it is oriented in space. For example, the base station is used to track the control device 320 absolute position and orientation in space. The controller device 320 may contain a sensor, which communicates with the base station to identify the controller device 320 position and orientation.

In one example, the offset distance d represents a distance between a point on the control device and the probe tip 312. The information sent from the control device 320 to the base station includes the offset distance. The information received at the base station may then be used to program a robot to perform actions by traversing through the captured points and orientations. The robot 302 may traverse paths that take into consideration the offset distance d. For example, the offset distance d may be measured from a point on the robot 302 (e.g., point 306) that is used to connect an end effector of the robot 302. In that case, the offset distance d may represent the length of the end effector. An example of that application may be when a welding attachment is used as an end effector. In another example, the offset distance d may be measured from a point on the end effector such that the end effector traverses through space while attached to the robot 302 and keeping a distance d from a surface. That is end effector attached to the robot 302 can traverse through the various points and orientations captured by the controller device 320 while keeping an offset distance d between the end effector the surface. This allows the robot arm to traverse through the various points and orientations by keeping a certain distance (e.g., the offset distance) from the surface.

It should be understood that the connector 309 may be a connector that can take a variety of attachments that may be associated with an end effector of a robotic device. For example, the connector 309 may take a specific attachment that may be similar or proportional to an attachment that goes on the end effector of a robotic device.

In one or more embodiments, a robotic welding system may define offset motions for the robot to follow. In that case, the robot will mimic the orientation of the controller device 320—as the user is holding it—but the robot will not attempt to go to its location. This will permit the person to stand beside the robot or outside a safety enclosure and have the robot mimic the movements of the person. However, the orientation of the end effector is absolute with what the person is doing rather than relative. For example, a user holding the controller device 320 may press a button on the controller device 320 in order to select this mode, or on a tablet may connected with the controller device 320. In this mode, the controller device 320 sends its data comprising its position and orientation to the base station, the base station communicates with the robot 302 to transmit that data to the robot 302. Further, the base station may implement this mode by executing an algorithm that comprises the robot 302 mimicking the controller device 320 within boundaries that may be assigned as parameters in this mode. These parameters may be defined by a user or a system administrator of the robotic welding system.

In one embodiment, the operator may move the controller device 320 to make contact at a surface with the probe tip 312. This allows the robotic welding system to teach the robot by capturing one or more points in space that may be defined for one or more purposes. For example, the operator may hold the controller device 320 by hand and may move the probe tip 312 onto one or more surfaces (e.g., planes, complex surfaces, cylinders, or any other surface) or even points in space that may define a space boundary. The operator may then press a trigger on the controller device 320 to capture (e.g., learn) the point and orientation of the probe 310 and the probe tip 312. The point and orientation may be stored for use in the robot program. For example, the controller device 320 may send the captured point and orientation of the probe 310 to the base station for processing.

In one embodiment, the distance between the probe tip and the sensor in the controller may be constant. In that case, the distance and the position and orientation of the controller device can be used to precisely calculate the position of the probe tip 312 in space. The controller device 320 may be held in any orientation as long as the tip of the probe is touching the point the operator would like to capture.

Referring to FIG. 3B, there is shown a controller device 320 and a cylinder 300.

Typically, a robot must be moved to the specified location and orientation to capture the desired point. This often means the operator must move the robot into a gross position and then make very slow, fine moves, to bring the robot into the exact orientation desired. Robotic applications require the operator to "teach", "program", or "capture" 3-dimensional points that serve as target points for robot motion.

In one embodiment, a robotic welding system may facilitate capturing features external to the robot to use for aligning the robot or even giving the robot an exact point or orientation to move to without ever actually moving the robot during the learning stage.

In one example, the operator may manipulate or move the controller device 320 such that the probe tip 312 may touch four points (e.g., points 332, 334, 336, and 338) on the circumference of the cylinder 300. The robotic welding system may facilitate the capture of these points in order to define the circular surface of the cylinder 300. The controller device 320 may transmit these captured points to a motion capture input device 123 of FIG. 1, which in turn may communicate those points to a robotic device. An operator may then execute a robotic program in order to manipulate the robotic device to traverse the circular surface of the cylinder 300 based at least in part on the captured points (e.g., points 332, 334, 336, and 338).

In one embodiment, the robotic welding system may determine the center 340 of the cylinder 300 based at least in part on the four points (e.g., points 332, three, 34, 336, and 338). The operator, in this case, does not need to point the probe tip 312 to the center of the cylinder. The system is able to deduce the center 340, based on the collected four points.

Although a cylinder 300 is given as an example, it should be understood that other shapes may be defined by one or more points in space that the controller device 320 is able to capture these shapes based on the one or more points in space. This allows the robot to traverse any surface (e.g., planes, complex surfaces, cylinders, or any other surface) by capturing the necessary points to define that shape. It should be understood also that the distance between the probe tip 312 and the sensor in the controller device 320 may be used as an offset to allow the robot to traverse any surface such that an attachment to the end effector of the robot may be proportional to the distance. This allows the operator to run the robot had a distance from the object without touching the object. It is understood that the above descriptions are for purposes of illustration and are not meant to be limiting.

Figures 4A, 4B:
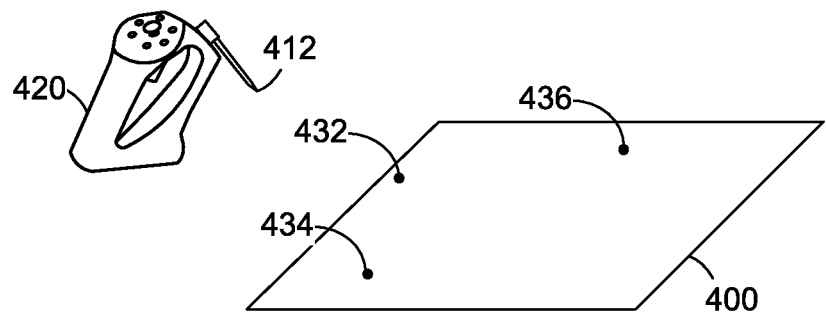
FIGS. 4A and 4B depict a robotic welding system, in accordance with one or more example embodiments of the present disclosure.

FIGS. 4A and 4B depict a robotic welding system, in accordance with one or more example embodiments of the present disclosure.

Referring to FIG. 4A, there is shown a controller device 420 that may be used, to capture (learn) one or more points in space (e.g., points 432, 434, and 436), in order to define a plane 400.

In one embodiment, the robotic welding system may facilitate that and operator may capture three points (e.g., points 432, 434, and 436) and use the software to define a 3-dimensional plane, which can be used as a new coordinate system or "base." A base is defined as a translation for the global base and a rotation from the global coordinate system.

Referring to FIG. 4B, there is shown a software interface showing the capture of points associated with a particular plane in space. The robotic welding system may use a control device 420 to capture "grab point" one or more points in space by pressing the trigger of the controller device 420 or by manually capturing the one or more points in space using the software interface or any other interface.

In one embodiment, the robotic welding system may align the robot with any of the axis of the bases. There may be variations of these bases that can be used. For example, in a lathe chuck application, the operator may define four or more points around the outside diameter of the lathe chuck and then a point on the face of the lathe chuck. The robot can then be aligned with this base with a certain offset. This allows the robot to be automatically aligned with the lathe chuck for inserting cylindrical parts. Current methods would have the operator put a cylindrical part in the robot gripper, jog the robot into position, and painstakingly align it with the lathe chuck. It should be understood that this method may be used for aligning the robot with any cylindrical body. In a vice application, an operator may use the controller device 420 to define the jaws of the vice and specify which jaws are fixed and which are moveable. This allows the operator to align and center a part in the vice with the press of a button on the controller device 420, without having to move the robot during the learning stage. In picking up objects applications, the operator may select a point and orientation for picking up an object. Parts can then be scaled in an array so that the robot picks up a different part from a tray each time. The probe can be used to indicate the pitch of each part in the rows and columns of the array. In the example of an assembly location, the operator may select a point and orientation for the robot to move to during the learning stage. During the execution stage, the robot may then move to that location when instructed to. In another example, an operator may select a plan and send commands so the robot orients perpendicular to the plane with a given offset. This allows the robot to be locked into a parallel "flight path" with the plan for performing operations like drawing, marking, or dispensing.

The robotic welding system may define one or more paths for the robot to follow. For example, a user using the controller device 420 may traverse a path in space while holding a trigger of the controller device 420 during a "teaching" stage such that the controller device 420 may transmit signals comprising information related to the speed, orientation, and coordinates of the controller device for at various points in the path in space. The signals may be received by the base station, which may be stored in a storage device for later use by the robot during an execution mode. The speed at which the user may have traversed the path may also be stored and used during the execution mode. For example, the speed of the robot after the "teaching" stage may match how fast the user traversed the path while holding the handheld controller device 420. Further, the speed at which the user traversed the path may be compared to a threshold before allowing the robot to move at that same speed for safety measures. For example, if the speed at which the user traversed the path was greater than the threshold, an adjustment may be made to the speed in order to bring the speed less than or equal to the threshold.

Another example may be defining a safety area. In this example, the operator may define a plane or portion of the 3D space of varying shapes using the probe that the robot will not violate with an end effector or other portions of the robot. In other words, the robotic welding system may facilitate the capture, during the learning stage, of one or more points in space in order to define a plane that may be used by the system to prevent parts of the robot from entering. One or more planes may be defined in order to create a safety area or an operable area. This may prevent the operator from accidentally being impacted by any parts of the robot during the execution of the program.

In one embodiment, the robotic welding system may facilitate the operator to click using the handheld control device 420, an area in space (e.g., point and orientation) to which the robot will travel. That is, the operator may "summon" the robot to a specific point and orientation in space. It should be understood that this area in space should be in the area that does not violate the safety area that may have been previously defined. In this case, the operator then modulates the speed at which the robot travels to that point using the trigger of the control device 420. Currently summoning the robot is not available in any other robot programming method. The user may specify a position and orientation for the robot to go to, but the point and orientation must be clearly identified first. This is not practical under circumstances where the user cannot visualize the location of the point in space.

In one embodiment, the robotic welding system may define a path through one or more points in space or on an object of various shapes, by placing the probe tip 412 of the controller device 420 on a workpiece, then press a record button on the controller device 420 (or using a software interface), and then move the control device 420 along a desired path on the workpiece, while the software continuously records the controller device 420 position and orientation. These recorded positions and orientations can then be used during the execution stage to move the robot through the same positions and orientations for applications such as robotic welding, painting, and materials dispensing.

Further, it may be conceivable to define limits for the robot while still "recording" positions. For example, a material is to be dispensed onto a flat surface (XY), the robotic welding system may define a Z-offset that the robot would maintain over the surface XY, and use the probe to "draw" out the dispensing pattern. The program would ignore any variation of the probe in Z, and would only "learn" the XY positions of the probe. Having a Z-axis (or other axis) offset allows a person to define a path with a stylus and have the robot end effector trace the path, but not contact the surface. For example, dispensing gasket material on an oil pan for a car.

One or more benefits of using the robotic welding system may be that the operator may be able to move the robot either by simply moving the handheld controller device 420 in space either simultaneously or during an execution mode. Further, this enables the operator to continuously focus on the robot during programming without the need to search for buttons. Furthermore, the robotic welding system does not require the operator to move the robot in order to capture a point, the operator may simply capture points with the control device 420, thus improving safety. The robotic welding system is more intuitive because regions are selected in the real world and transferred to the robot virtual world.

Currently, with existing systems, the operator must position the robot by moving each of the individual robot points to reach the desired position. The operator can also move the robot by incrementing the X, Y, Z, A, B, and C parameters of the robots position. Further, the operator must continuously shift their attention between the teach pendant and the robot to select the appropriate button and monitor the robot as it moves. This is a very inefficient and unsafe mechanism to program and implement a robotic program.

In addition to teach pendants, there are a number of application-specific products and collaborative robots (cobots) available which allow the operator to physically grasp the robot and move it to the desired teach points. The goal of these products is to make the programming process more intuitive, but there are limitations.

These tools are often application-specific which reduces the number of applications where the technology can be applied or makes the technology difficult to apply outside of its intended application. However, the robotic welding system enables operators to program robots for a much wider set of applications.

Further, these tools require the operator to physically grasp the robot, which poses a safety risk if the technology fails, or the operator is not paying attention. The robotic welding system enables the operator to stand at a safe distance from the robot. Additionally, the robotic welding system may capture points without the need for the robot to be active which increases operator safety.

Although cobots are intuitive to program, they must adhere to safety regulations that limit their operating speed and payload capacity. This limits their applicability. The robotic welding system enables a cobot-like experience to be applied to any robot, including robots which run much more quickly and are much larger. It is understood that the above descriptions are for purposes of illustration and are not meant to be limiting.

Figure 5:
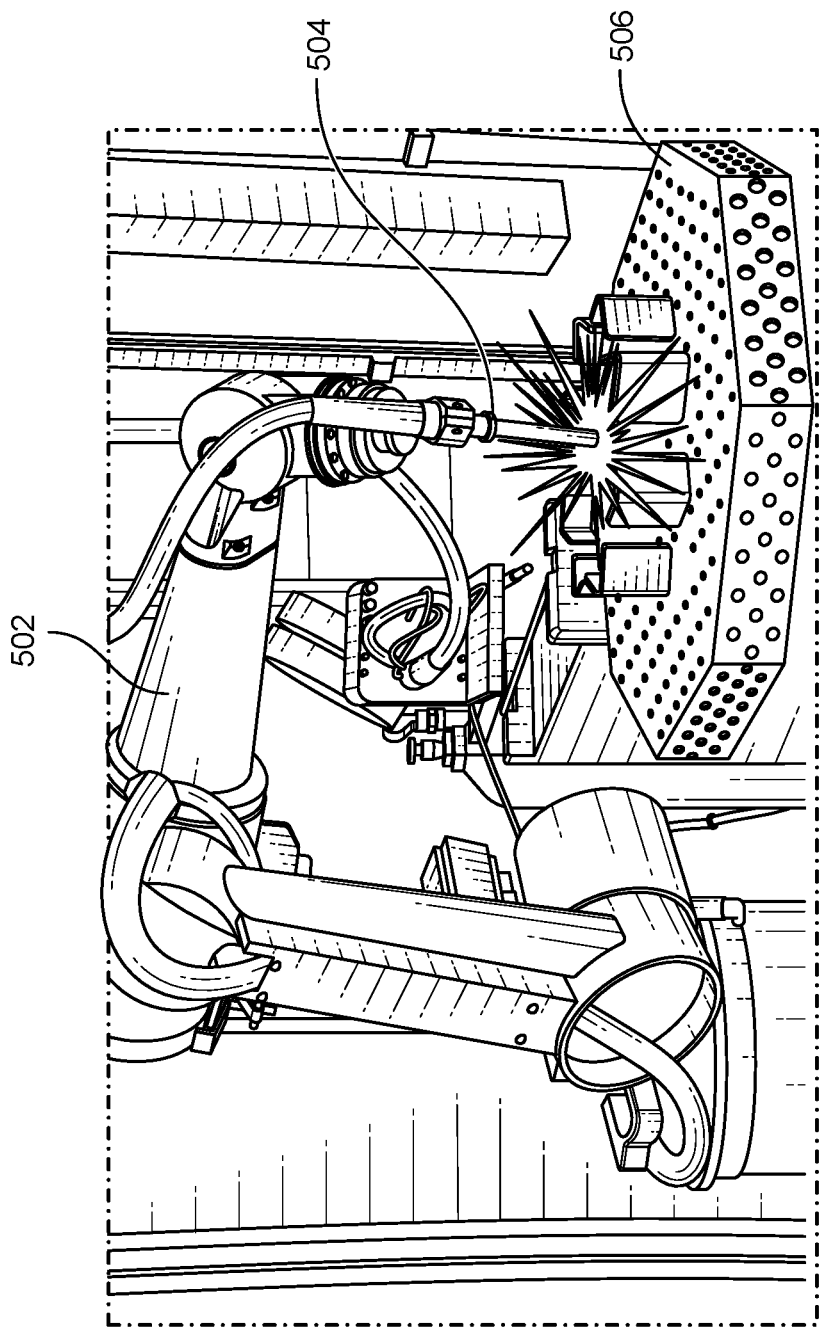
FIG. 5 depicts an illustrative schematic diagram for a robotic welding system, in accordance with one or more example embodiments of the present disclosure.

FIG. 5 depicts an illustrative schematic diagram for a robotic welding system, in accordance with one or more example embodiments of the present disclosure.

Referring to FIG. 5, there is shown a robotic device 502. The robotic device 502 may be a six axis robot arm that connected using a remote handheld controller that allows a user to manually guide the robotic device 502. A welding torch 504 whether MIG or TIG, may be connected to the end of the six axis arm (e.g., an end effector) of the robotic device 502. Further, there is shown a table 506 which could act as a manipulator for a workpiece to be welded. The manipulator (e.g., table 506) may be a robot moving in 3D space.

In one or more embodiments, a robotic welding system may facilitate switching control between torch robot (e.g., robotic device 502) and workpiece manipulator (e.g., table 506). The robotic welding system may be switched on the fly between guiding the motion of the welding robot 502 holding the welding torch 504 and controlling the manipulator (e.g., table 506) holding the workpiece (if a manipulator is used). The manipulator is typically a one or more axis robotic device which can slide, rotate, or reposition the workpiece for improved access during welding. For example, the table 506 can rotate, which is an example of a welding manipulator that may be used in conjunction with the welding robot 502. A manipulator could be a completely separate 6 axis robot. A benefit of using a manipulator in conjunction with the welding robot 502 is that it allows an operator to alter the position not only of the torch side of the operation but also the workpiece that is being welded. It should be understood that a handheld controller may control the welding robot 502 to as well as the manipulator (e.g., table 506). In some embodiments, a separate controller may be used to move the manipulator. It is understood that the above descriptions are for purposes of illustration and are not meant to be limiting.

Figure 6:
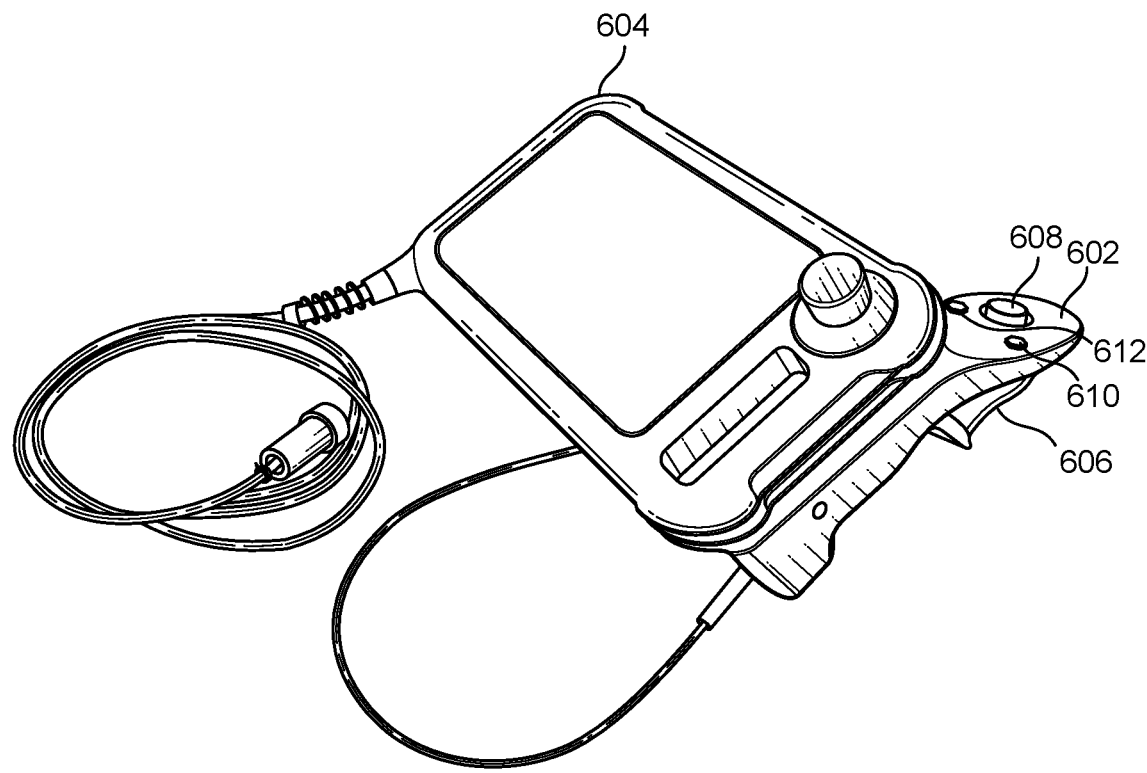
FIG. 6 depicts an illustrative schematic diagram for a robotic welding system, in accordance with one or more example embodiments of the present disclosure.

FIG. 6 depicts an illustrative schematic diagram for a robotic welding system, in accordance with one or more example embodiments of the present disclosure.

Referring to FIG. 6, there is shown a pendant 604 and a handheld controller 602.

The handheld controller 602 (e.g., the controller device 102 of FIG. 1, controller device 220 of FIG. 2A) comprises a number of buttons (e.g., buttons 610 and 612), a joystick 608, and a trigger 606 which are communicatively synchronized and connected to the robot. As the user moves the handheld controller around in 3D space, the welding torch, attached to the six axis robotic arm, mimics the translation and orientation of the user's hand but I also moving in the same translation revision of the handheld controller as the user moves his or her hand in 3D space. That is if the user raises his/her hand that is holding the handheld controller 602 up or down, or sideways, or any combination of movements, then the robotic arm would follow those movements in a parallel manner. That is, the robotic arm moves in a same path however at a different location than the handheld device. For example, if the handheld controller is at coordinates X, Y, Z then moves according to a path in 3D space, the robotic arm may be at coordinates X1, Y1, Z1 then moves according to the same path but starting from a different location than the handheld controller. This allows the user to position the torch in any location and orientation relative to the workpiece by moving the handheld controller within a working zone. Additionally, the user may be holding a pendant 604 in their other hand which allows them to set welding parameters on the fly and in real time. These welding parameters may include but are not limited to the following: weave pattern (trapezoidal, sinusoidal, spiral, triangle, etc.), weld speed, wire speed, current, etc. These settings can be changed at any time, and are used on each weld that the robot performs. This way, welds are performed very quickly with the sub-millimeter precision and repeatability of robotics. For example, as a user controls the movement of the robotic arm using the handheld controller in 3D space, a user may supplement the movements of the robotic arm using welding parameters that are provided through the pendant 604. It is understood that the above descriptions are for purposes of illustration and are not meant to be limiting.

Figure 7:
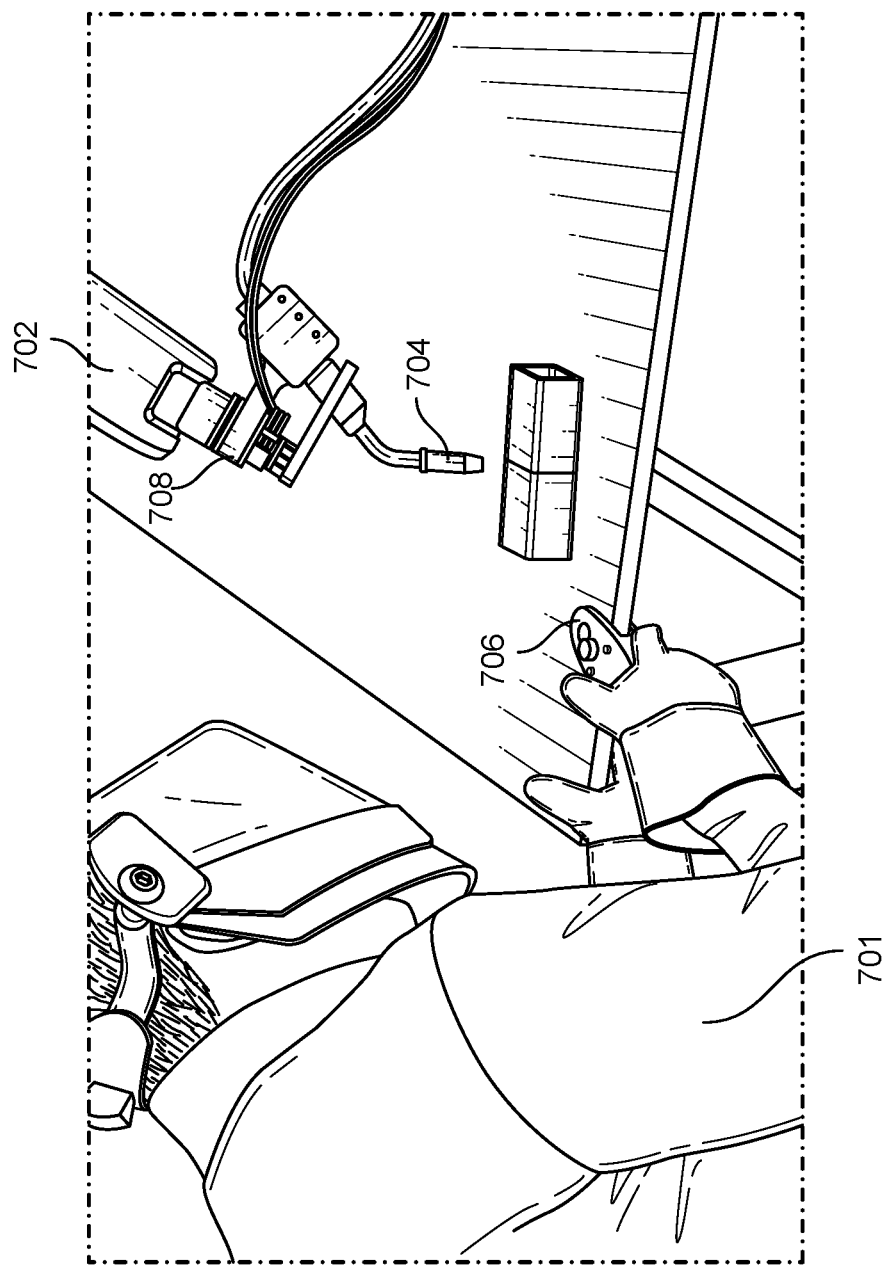
FIG. 7 depicts an illustrative schematic diagram for a robotic welding system, in accordance with one or more example embodiments of the present disclosure.

FIG. 7 depicts an illustrative schematic diagram for a robotic welding system, in accordance with one or more example embodiments of the present disclosure.

Referring to FIG. 7, there is shown a user 701 using a handheld controller 706 that comprises one or more buttons, a joystick, and a trigger. Additionally, an end effector 708 of a robotic arm 702 may comprise an attachment to a welding device 704.

In one or more embodiments, the user 701 may manipulate the handheld controller 706 by moving his or her hand in space in order to cause the robotic device 702 to mimic the movements of the user 701. The user 701 may control the weld using the handheld controller 706. There are many benefits of utilizing the handheld controller 706 to perform the weld. For example, robots are used in many scenarios to weld, however, these systems take a long time to program and are not cost effective for high-mix, low-volume applications. Since it often takes minutes or hours to program a robot for welding paths using highly trained robot technicians, robots are only employed where high volume parts are being produced. Additionally, it is usually the welders themselves that know how the torch should move and what settings should be used, not the robot programmer. One advantage is that current methods require that an entire program needs to be written and saved. Again, this is necessary for high volume. If it is now so simple to move the robot into position by the handheld controller 706, a single weld can be done at once to create a high quality weld. Further, since control over the torch is so fine and precise using the handheld controller 706, remote welding can now be accomplished by someone who knows how to weld. Furthermore, a user only needs to help the robot follow a path using the handheld controller 706 and does not need to be an expert in manual weave control. These benefits fill a large gap between manual welding which requires high skill and is necessary for high-mix, low-volume part runs and fully automated welding, which previously was only cost effective for high-volume applications. It is understood that the above descriptions are for purposes of illustration and are not meant to be limiting.

Figure 8:
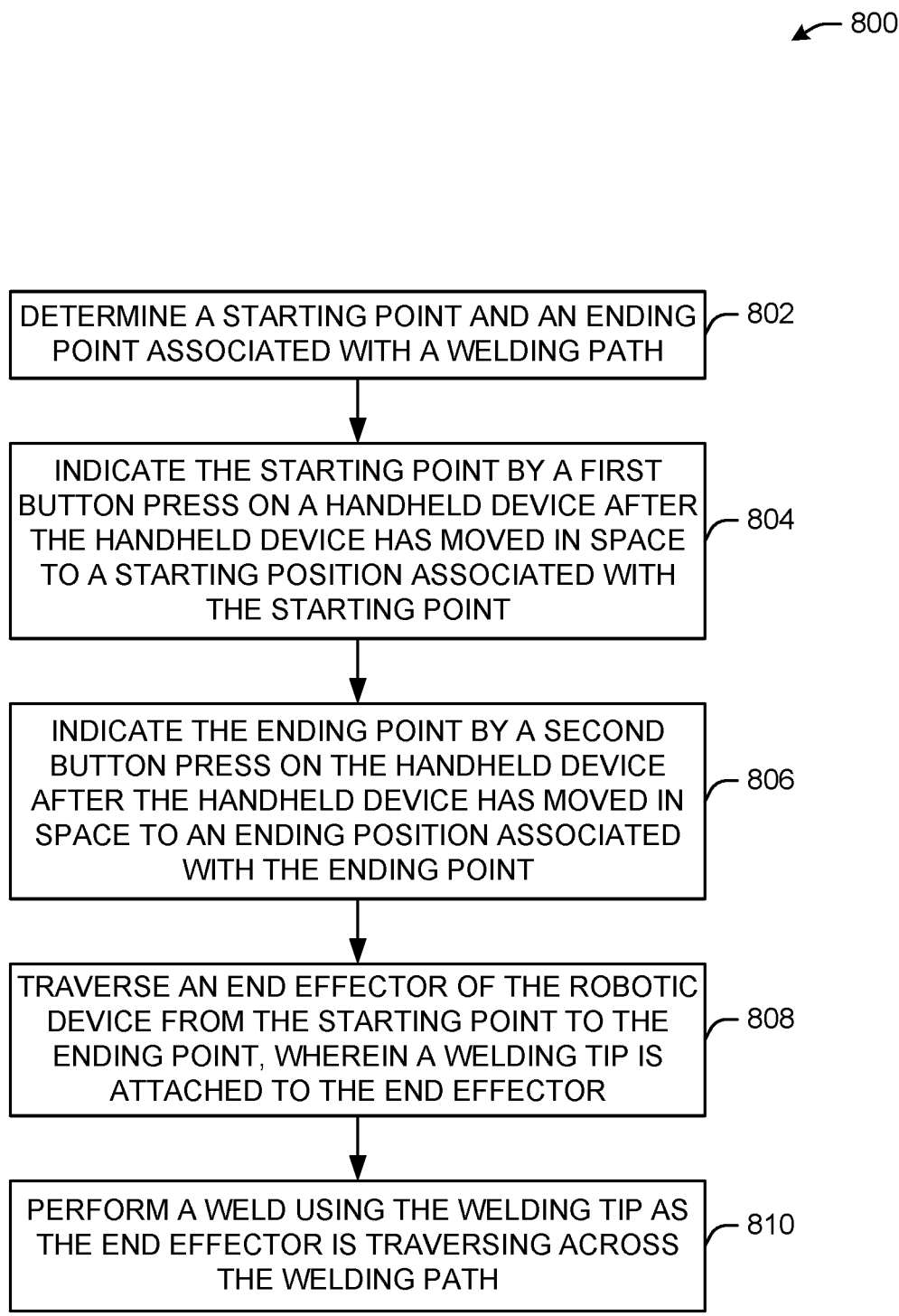
FIG. 8 illustrates a flow diagram of process for an illustrative robotic welding system, in accordance with one or more example embodiments of the present disclosure.

FIG. 8 illustrates a flow diagram of illustrative process 800 for an illustrative robotic welding system, in accordance with one or more example embodiments of the present disclosure.

At block 802, a robotic device (e.g., the robotic device(s) 120 of FIG. 1) may determine a starting point and an ending point associated with a welding path. The welding path is saved into the at least one memory by pressing at least one button on the handheld device after determining the starting point and the ending point of the welding path.

At block 804, the robotic device may indicate the starting point by a first button press on a handheld device after the handheld device has moved in space to a starting position associated with the starting point. The starting position is determined by moving the end effector to a first location using the handheld device and pressing the first button on the handheld device to indicate that the first location is the starting position.

At block 806, the robotic device may indicate the ending point by a second button press on the handheld device after the handheld device has moved in space to an ending position associated with the ending point. The ending position is determined by moving the end effector to a second location after the starting position has been determined and pressing the second button on the handheld device to indicate that the second location is the end position.

At block 808, the robotic device may traverse an end effector of the robotic device from the starting point to the ending point, wherein a welding tip is attached to the end effector.

At block 810, the robotic device may perform a weld using the welding tip as the end effector is traversing across the welding path. Apply one or more preset functions while performing the weld, wherein the one or more preset functions are inputted from a pendant. The one or more preset functions include at least in part current, voltage, wire speed, weave pattern, or dwell.

Wherein pulling a trigger of the handheld device controls the speed of movement along the welding path. The handheld device controls arming the welding tip by pressing a second button on the handheld device, and wherein an arc starts once a trigger of the handheld device is pressed. The welding path is a first welding path of a group of discrete welding paths. The workpiece manipulator is capable of rotating, repositioning, or sliding the workpiece for the weld. The device may switch control between the robotic device and a workpiece manipulator using the handheld device. It is understood that the above descriptions are for purposes of illustration and are not meant to be limiting.

FIG. 9 illustrates a block diagram of an example of a robotic machine 900 or system upon which any one or more of the techniques (e.g., methodologies) discussed herein may be performed. In other embodiments, the robotic machine 900 may operate as a stand-alone device or may be connected (e.g., networked) to other machines. In a networked deployment, the robotic machine 900 may operate in the capacity of a server machine, a client machine, or both in server-client network environments. As an example, the robotic machine 900 may act as a peer machine in peer-to-peer (P2P) (or other distributed) network environments. The robotic machine 900 may be any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer-readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

Certain embodiments may be implemented in one or a combination of hardware, firmware, and software. Other embodiments may also be implemented as a program code or instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the robotic machine 900 may include one or more processors and may be configured with program code instructions stored on a computer-readable storage device memory. Program code and/or executable instructions embodied on a computer-readable medium may be transmitted using any appropriate medium including, but not limited to, wireless, wireline, optical fiber cable, RF, etc., or any suitable combination of the foregoing. Program code and/or executable instructions for carrying out operations for aspects of the disclosure may be written in any combination of one or more programming languages, including an object-oriented programming language such as Java, Smalltalk, C++ or the like, and conventional procedural programming languages, such as the "C" programming language or similar programming languages. The program code and/or executable instructions may execute entirely on a device, partly on the device, as a stand-alone software package, partly on the device and partly on a remote device or entirely on the remote device or server.

The robotic machine 900 may include at least one hardware processor 902 (e.g., a central processing unit (CPU), a graphics processing unit (GPU), a hardware processor core, or any combination thereof), a main memory 904, and a static memory 906. The robotic machine 900 may include drive circuitry 918. The robotic machine 900 may further include an inertial measurement device 932, a graphics display device 910, an alphanumeric input device 912 (e.g., a keyboard), and a user interface (UI) navigation device 914 (e.g., a mouse). In an example, the graphics display device 910, the alphanumeric input device 912, and the UI navigation device 914 may be a touch screen display. The robotic machine 900 may additionally include a storage device 916, a robotic welding device 919, a network interface device/transceiver 920 coupled to antenna(s) 930, and one or more sensors 928. The robotic machine 900 may include an output controller 934, such as a serial (e.g., universal serial bus (USB), parallel, or other wired or wireless (e.g., infrared (IR), near field communication (NFC), etc.) connection to communicate with or control one or more peripheral devices. These components may couple and may communicate with each other through an interlink (e.g., bus) 908. Further, the robotic machine 900 may include a power supply device that is capable of supplying power to the various components of the robotic machine 900. Other components may be included, such as, lights or display on a controller device (e.g., the controller device 102 of FIG. 1), and other modes of point capture (e.g., 2D scanner, vision system, alternating magnetic field, etc.).

The drive circuitry 918 may include a motor driver circuitry that operates various motors associated with the axes of the robotic machine 900. Motors may facilitate the movement and positioning of the robotic machine 900 around the respective axes for a plurality of degrees of freedom (e.g., X, Y, Z, pitch, yaw, and roll). The motor driver circuitry may track and modify the positions around the axes by affecting the respective motors.

The inertial measurement device 932 may provide orientation information associated with a plurality of degrees of freedom (e.g., X, Y, Z, pitch, yaw, roll, roll rate, pitch rate, yaw rate) to the hardware processor 902. The hardware processor 902 may, in turn, analyze the orientation information and generate, possibly using both the orientation information and the encoder information regarding the motor shaft positions, control signals for each motor. These control signals may, in turn, be communicated to motor amplifiers to independently control motors to impart a force on the system to move the system. The control signals may control motors to move a motor to counteract, initiate, or maintain rotation.

The hardware processor 902 may be capable of communicating with and independently sending control signals to a plurality of motors associated with the axes of the robotic machine 900.

The storage device 916 may include a machine-readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, or within the hardware processor 902 during execution thereof by the robotic machine 900. In an example, one or any combination of the hardware processor 902, the main memory 904, the static memory 906, or the storage device 916 may constitute machine-readable media.

The antenna(s) 930 may include one or more directional or omnidirectional antennas, including, for example, dipole antennas, monopole antennas, patch antennas, loop antennas, microstrip antennas, or other types of antennas suitable for the transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

The robotic welding device 919 may facilitate controlling the robot motion based on a hand gesture while holding the controller device. For example, a user may hold the controller device and may move his or her hand such that the robot moves in the same direction as the hand gesture. That is, the robot may follow the controller device's movement direction regardless of the controller device's orientation and with a speed that is proportional to the amount of force applied to the trigger. This allows the user to program the robot very quickly and intuitively. For example, as the handheld controller device traverses a path in space, it sends at a predetermined time interval information including the handheld controller device coordinates to the motion capture input device.

The robotic welding device 919 may facilitate a single point and orientation capture in 3D space using a handheld controller and touch probe. The touch probe may allow capturing of one or more points and orientations in the 3D space as the handheld device traverse the 3D space. The touch probe and handheld controller could be the same device, or separate devices that may be connected together. In one embodiment, the touch probe may be attached to the handheld controller to act similarly to the robot end effectors. That is, the touch probe may act as an end effector of a robot, which may move based on the movements of the handheld device. This is useful for teaching the robot without moving the robot. For example, if the end effector of the robot has an attachment that includes a gripper, the touch probe on the controller device may also act as a gripper attached to the handheld device. This arrangement may be used by a user to capture one or more points and orientations in the 3D space. These captured points and orientations may then be used to program the robot. The robot may then perform the actions that were programmed using the handheld controller and the touch probe.

The robotic welding device 919 may facilitate the creation of one or more planes, points, or axes based at least in part on capturing of points and orientations in 3D space using the handheld controller and the touch probe.

The robotic welding device 919 may instantaneously align a robot to planes or axes defined by the controller point capture.

The robotic welding device 919 may facilitate the ability to prevent a robot from moving past "keepout" planes or regions, which are defined using planes (or other shapes such as cylinders), captured above. Keepouts could apply to the end effector, other parts of the robot, or both. Adding "keepout areas" by defining those areas in the real world via a position recording device allows for the robot programmer to not hit any objects while programming. This feature, is not available in any other robot programming methods.

The robotic welding device 919 may use one or more methods of position and orientation capture. For example, the robotic welding system may "fuse" together one or more technologies to overcome weaknesses faced by other technologies. For example, optical techniques may provide higher accuracy than magnetic ones, but optical techniques are limited to line of sight operations. The robotic welding system may use magnetic, optical, inertial measurement units (IMUs), and other techniques for capturing position and orientation in a robotic application concurrently and/or simultaneously. In some examples, tracking dots, or a "puck" with LED's may be placed on the handheld controller and on the end effector of the robot. The cameras track both objects and are able to understand the location and orientation of the objects in space. This allows robotic welding system to get sub-millimeter precision.

The robotic welding device 919 may facilitate a robot teaching using a robot orientation and path planning by selecting individual points in free space using the controller. In play mode, the robot may traverse from point to point based on the captured orientation and path. The robot can come to rest at one point, or follow points as portions of a spline. The advantage is that the operator may teach entire paths or portions of paths without moving the robot. An example may be selecting individual points along a welding path.

The robotic welding device 919 may facilitate robot teaching using a robot orientation and path planning by "recording" a path in free space using the handheld controller. In play mode, the robot may follow this path as a complete spline. An example may be teaching the robot how to spray paint a car or weld an object by moving the handheld controller in 3D space and having the touch probe acting as a spray nozzle or a welding tip.

The robotic welding device 919 may facilitate the ability to "call" the robot to a specific position based on a single position and orientation reading from the handheld controller. The user may select the position in free space, moves out of the way, and then initiates the robot's move to the selected position by modulating the speed with the trigger on the controller. That is the user may make the robot move from slow to fast based on gently pressing the trigger to firmly pressing the trigger. For example, the user may move the handheld controller during the learning stage and may press at least one button on the handheld controller to program the position in free space.

The robotic welding device 919 may perform one weld at a time using a handheld controller. Instead of writing a program to weld out an entire part, this simply is a feature that allows the operator to move the torch to an initial start position by moving the handheld in space to be positioned at the initial start position, the operator may then click a button to indicate the start point, and then move the handheld controller and a path that may be mimicked by the robot where the operator may then click one or more additional points through that path, which the robot will move the welding torch to create an uninterrupted weld path. When the operator selects "run" and squeezes the trigger of the handheld controller, the robot automatically moves back to the start point, turns on the arc, follows the pre-recorded path using the pre-set parameters (weave settings, wire speed, weld speed, weld angle, etc.), and then automatically turns the arc off. Essentially, the welder is having the robot perform a weld, one weld at a time.

The robotic welding device 919 may facilitate that the weld path could be saved and eventually be part of a larger program, but a function of this feature is to have a robot do a single weld path at a time with perfect weave and speed control then add additional well paths that are saved separately. The operator may save a single weld path as described above by starting from an initial start position and clicking a button on the handheld controller as the operator moves from the initial start position to the next point in the path. When the operator clicks the button on the handheld controller, the system save that points in space so that the robot may traverse the path from the initial start position to the next point in the path. The robot uses preset functions like current, voltage, wire speed, weave pattern, dwell, etc. while performing the weld. This is useful for operators who do not have precise weave control, for reducing operator fatigue, or where the orientation or location of the weld is difficult for a human to navigate. It is helpful when operators are welding one part at a time, or where the parts have a significant amount of variability. It provides a much more uniform weld than if the operator is welding all parts completely by hand in one motion.

The robotic welding device 919 may facilitate remote manual welding using a handheld controller. The operator many move the torch, attached to the robot arm, to the desired start location and may press a button on the handheld controller to "arm" the system. Once the system is armed, the arc starts once the operator pulls the trigger on the handheld controller. Pulling the trigger gives the user control of the orientation and translational position of the torch and maintains the arc in the "on" position. The operator uses the handheld controller to move the torch across the weld path, using a manually controlled weave or any other path, to complete the weld. The robot follows the exact path of the operator's hand. When the operator releases the trigger, the arc is turned off and the robot stops moving. If the operator pulls the trigger again without "arming" the system, the robot will move, but the arc will not start. This is useful for welding in hazardous environments, where welding is done using a camera, or anywhere that is inconvenient or unfeasible to have the operator in close proximity to the arc.

The robotic welding device 919 may facilitate remote manual welding with automatic weave control. This is similar to the remote manual welding described above, except the operator simply guides the robot across the desired path. The weld speed is controlled by the variable press of the trigger on the handheld controller. That is, based on the amount of pressure applied to the trigger, the weld speed is adjusted accordingly. The weave portion (side to side, circular motion, trapezoidal, etc.) of the robot path is performed automatically. The operator can control the distance from the torch to the workpiece by visual observation and manual control using the controller, or by using a laser distance, or other non-contact distance sensor which keeps the torch at a constant distance or specific angle to the workpiece.

The robotic welding device 919 may facilitate switching control between torch robot and workpiece manipulator. The robotic welding system may be switched on the fly between guiding the motion of the welding robot holding the torch and controlling the manipulator holding the workpiece (if a manipulator is used). The manipulator is typically a one or more axis device which can slide, rotate, or reposition the workpiece for improved access during welding. For example, a table can rotate and is an example of a welding manipulator. A manipulator could be a completely separate 6 axis robot.

It is understood that the above are only a subset of what the robotic welding device 919 may be configured to perform and that other functions included throughout this disclosure may also be performed by the robotic welding device 919.

While the machine-readable medium 922 is illustrated as a single medium, the term "machine-readable medium" may include a single medium or multiple media (e.g., a centralized or distributed database, and/or associated caches and servers) configured to store the one or more instructions 924.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read-only memory (ROM), random-access memory (RAM), magnetic disk storage media; optical storage media' a flash memory, etc.

The term "machine-readable medium" may include any medium that is capable of storing, encoding, or carrying instructions for execution by the robotic machine 900 and that cause the robotic machine 900 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device/transceiver 920 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, and peer-to-peer (P2P) networks, among others. In an example, the network interface device/transceiver 920 may include one or more physical jacks (e.g., Ethernet, coaxial, or phone jacks) or one or more antennas (e.g., antennas 930) to connect to the communications network 926. In an example, the network interface device/transceiver 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the robotic machine 900 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a single input single output (SISO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations. Certain aspects of the disclosure may take the form of an entirely hardware embodiment, an entirely software embodiment (including firmware, resident software, micro-code, etc.), or an embodiment combining software and hardware aspects that may all generally be referred to herein as a "service," "circuit," "circuitry," "module," and/or "system."

The computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A robotic device, comprising:
   at least one memory that stores computer-executable instructions; and
   at least one processor configured to access the at least one memory, wherein the at least one processor is configured to execute the computer-executable instructions to:
      define one or more keepout planes to prevent an end effector from crossing the one or more keepout planes;
      define one or more planes using one or more captured points in space during a learning stage using a probe;

determine a starting point and an ending point associated with a welding path;

indicate the starting point by a first button press on a remote handheld device after the remote handheld device has moved in space to a starting position associated with the starting point, wherein the remote handheld device comprises the probe;

determine coordinates of a probe tip of the probe based on a profile associated with the probe;

indicate the ending point by a second button press on the remote handheld device after the remote handheld device has moved in space to an ending position associated with the ending point;

move the remote handheld device to a point in space associated with the ending point;

traverse the end effector of the robotic device from the starting point to the ending point, wherein a welding tip is attached to the end effector;

prevent the end effector from crossing the one or more keepout planes;

perform a weld using the welding tip as the end effector is traversing across the welding path; and apply one or more preset functions while performing the weld, wherein the one or more preset functions are input from a pendant, and wherein the one or more preset functions comprises at least current, voltage, wire speed, weave pattern, and dwell.

2. The robotic device of claim 1, wherein the welding path is saved into the at least one memory by pressing at least one button on the remote handheld device after determining the starting point and the ending point of the welding path.

3. The robotic device of claim 1, wherein pulling a trigger of the remote handheld device controls the speed of movement along the welding path.

4. The robotic device of claim 1, wherein the starting position is determined by moving the end effector to a first location using the remote handheld device and pressing the first button on the remote handheld device to indicate that the first location is the starting position.

5. The robotic device of claim 1, wherein the ending position is determined by moving the end effector to a second location after the starting position has been determined and pressing the second button on the remote handheld device to indicate that the second location is the end position.

6. The robotic device of claim 1, wherein the remote handheld device controls arming the welding tip by pressing a second button on the remote handheld device, and wherein an arc starts once a trigger of the remote handheld device is pressed.

7. The robotic device of claim 1, wherein the welding path is a first welding path of a group of discrete welding paths.

8. The robotic device of claim 1, wherein the processor is further configured to execute the computer-executable instructions to switch control between the robotic device and a workpiece manipulator using the remote handheld device.

9. The robotic device of claim 8, wherein the workpiece manipulator is capable of rotating, repositioning, or sliding the workpiece for the weld.

10. A non-transitory computer-readable medium storing computer-executable instructions which when executed by one or more processors result in performing operations comprising:

defining one or more keepout planes to prevent an end effector from crossing the one or more keepout planes;

defining one or more planes using one or more captured points in space during a learning stage using a probe;

determining a starting point and an ending point associated with a welding path;

indicating the starting point by a first button press on a remote handheld device after the remote handheld device has moved in space to a starting position associated with the starting point, wherein the remote handheld device comprises the probe;

determining coordinates of a probe tip of the probe based on a profile associated with the probe;

indicating the ending point by a second button press on the remote handheld device after the remote handheld device has moved in space to an ending position associated with the ending point;

moving the remote handheld device to a point in space associated with the ending point;

traversing the end effector of a robotic device from the starting point to the ending point, wherein a welding tip is attached to the end effector;

preventing the end effector from crossing the one or more keepout planes;

performing a weld using the welding tip as the end effector is traversing across the welding path; and applying one or more preset functions while performing the weld, wherein the one or more preset functions are inputted from a pendant, and wherein the one or more preset functions comprises at least current, voltage, wire speed, weave pattern, and dwell.

11. The non-transitory computer-readable medium of claim 10, wherein the welding path is saved into memory by pressing at least one button on the remote handheld device after determining the starting point and the ending point of the welding path.

12. The non-transitory computer-readable medium of claim 10, wherein pulling a trigger of the remote handheld device controls the speed of movement along the welding path.

13. The non-transitory computer-readable medium of claim 10, wherein the starting position is determined by moving the end effector to a first location using the remote handheld device and pressing the first button on the remote handheld device to indicate that the first location is the starting position.

14. A method comprising:

defining one or more keepout planes to prevent an end effector from crossing the one or more keepout planes;

defining one or more planes using one or more captured points in space during a learning stage using a probe;

determining, by one or more processors, a starting point and an ending point associated with a welding path;

indicating the starting point by a first button press on a remote handheld device after the remote handheld device has moved in space to a starting position associated with the starting point, wherein the remote handheld device comprises a probe;

determining coordinates of a probe tip of the probe based on a profile associated with the probe;

indicating the ending point by a second button press on the remote handheld device after the remote handheld device has moved in space to an ending position associated with the ending point;

moving the remote handheld device to a point in space associated with the ending point;

traversing the end effector of a robotic device from the starting point to the ending point, wherein a welding tip is attached to the end effector;

preventing the end effector from crossing the one or more keepout planes;

performing a weld using the welding tip as the end effector is traversing across the welding path; and applying one or more preset functions while performing the weld, wherein the one or more preset functions are inputted from a pendant, and wherein the one or more preset functions comprises at least current, voltage, wire speed, weave pattern, and dwell.

15. The method of claim 14, wherein the welding path is saved into memory by pressing at least one button on the remote handheld device after determining the starting point and the ending point of the welding path.

\* \* \* \* \*